(12) United States Patent
Wehrmann et al.

(10) Patent No.: US 8,285,350 B2
(45) Date of Patent: Oct. 9, 2012

(54) MOBILE WIRELESS COMMUNICATIONS DEVICE INCLUDING SPACED APART ELONGATE MEMBERS FOR REDUCING SAR AND RELATED METHODS

(75) Inventors: Christopher Wehrmann, Bochum (DE); Michael Kühn, Bochum (DE); Adrian Piseu Davis, Davie, FL (US)

(73) Assignee: Research In Motion Limited, Waterloo, Ontario (CA)

( * ) Notice: Subject to any disclaimer, the term of this patent is extended or adjusted under 35 U.S.C. 154(b) by 57 days.

(21) Appl. No.: 12/900,929

(22) Filed: Oct. 8, 2010

(65) Prior Publication Data

US 2012/0088560 A1 Apr. 12, 2012

(51) Int. Cl.
*H04M 1/00* (2006.01)
*H01Q 1/24* (2006.01)

(52) U.S. Cl. .................................. 455/575.7; 343/702

(58) Field of Classification Search .................. 455/575, 455/63, 550.1, 562; 343/700–702
See application file for complete search history.

(56) References Cited

U.S. PATENT DOCUMENTS

| | | | |
|---|---|---|---|
| 6,031,495 A * | 2/2000 | Simmons et al. | 343/702 |
| 6,348,895 B1 | 2/2002 | Tay et al. | 343/702 |
| 6,954,181 B2 | 10/2005 | Park et al. | 343/702 |
| 7,383,067 B2 | 6/2008 | Phillips et al. | 455/575.1 |
| 7,554,496 B2 | 6/2009 | Qi et al. | 343/702 |
| 7,728,811 B2 | 6/2010 | Albert et al. | 345/107 |
| 2004/0012730 A1 | 1/2004 | Pan et al. | 349/60 |
| 2004/0046701 A1 * | 3/2004 | Huber et al. | 343/702 |
| 2005/0024275 A1 | 2/2005 | Jo et al. | 343/702 |
| 2008/0055162 A1 | 3/2008 | Qi et al. | 343/702 |
| 2008/0055167 A1 | 3/2008 | Leizerovich et al. | 343/702 |
| 2009/0273525 A1 | 11/2009 | Qi et al. | 343/702 |

OTHER PUBLICATIONS

Compliance Engineering, The latest in Compliance Engineering Products and Services, Feb. 2005, pp. 1-7.
Bastenbeck et al., A Comparison of Conductive Coatings for EMI Shielding Applications, 2009, pp. 1-11.
Nakamura et al., Reduction of Specific Absorption Rate (SAR) in Human Body by a Lossy Dielectric Shield (Abstract), Dec. 7, 1998, pp. 1-2.

* cited by examiner

*Primary Examiner* — Kamran Afshar
*Assistant Examiner* — Kashif Siddiqui
(74) *Attorney, Agent, or Firm* — Allen, Dyer, Doppelt, Milbrath & Gilchrist, P.A.

(57) ABSTRACT

A mobile wireless communications device may include a portable housing and wireless transceiver circuitry carried by the portable housing. The mobile wireless communications device may also include an antenna carried by the portable housing and coupled to the wireless transceiver circuitry, and a light source carried by the portable housing. The device may further include a keyboard assembly carried by the portable housing including a light guide coupled to the light source and having input key receiving openings therein, and a mask carried by the light guide and having input key receiving openings. The mask may include spaced apart electrically conductive elongate members positioned relative to the antenna to reduce a Specific Absorption Rate value for the mobile wireless communications device.

21 Claims, 5 Drawing Sheets

MOBILE WIRELESS COMMUNICATIONS DEVICE INCLUDING SPACED APART ELONGATE MEMBERS FOR REDUCING SAR AND RELATED METHODS

TECHNICAL FIELD

The present disclosure relates to the field of wireless communications, and, more particularly, to mobile wireless communications devices and related methods.

BACKGROUND

Mobile wireless communications systems continue to grow in popularity and have become an integral part of both personal and business communications. For example, cellular telephones allow users to place and receive voice calls almost anywhere they travel. Moreover, as cellular telephone technology has increased, so too has the functionality of cellular devices and the different types of devices available to users. For example, many cellular devices now incorporate personal digital assistant (PDA) features such as calendars, address books, task lists, etc. Moreover, such multi-function devices may also allow users to wirelessly send and receive electronic mail (email) messages and access the Internet via a cellular network and/or a wireless local area network (WLAN), for example.

Even so, as the functionality of cellular communications devices continues to increase, so too does the demand for smaller devices which are easier and more convenient for users to carry. One challenge this poses for cellular device manufacturers is designing the layout of components for additional functionality and operational stability within the relatively limited amount of space available for the components.

Moreover, with the ever increasing trend towards smaller cell phone sizes with increased functionality, for a relatively small phone, it may be increasingly difficult for cellular device manufacturers to comply with certain requirements. For example, for a relatively small phone having an internal antenna, the antenna may be in relatively close proximity to the user's face or cheek, which may make complying with applicable SAR and/or hearing aid compatibility (HAC) requirements potentially difficult for manufacturers.

DETAILED DESCRIPTION OF THE PREFERRED EMBODIMENTS

Figure 1:
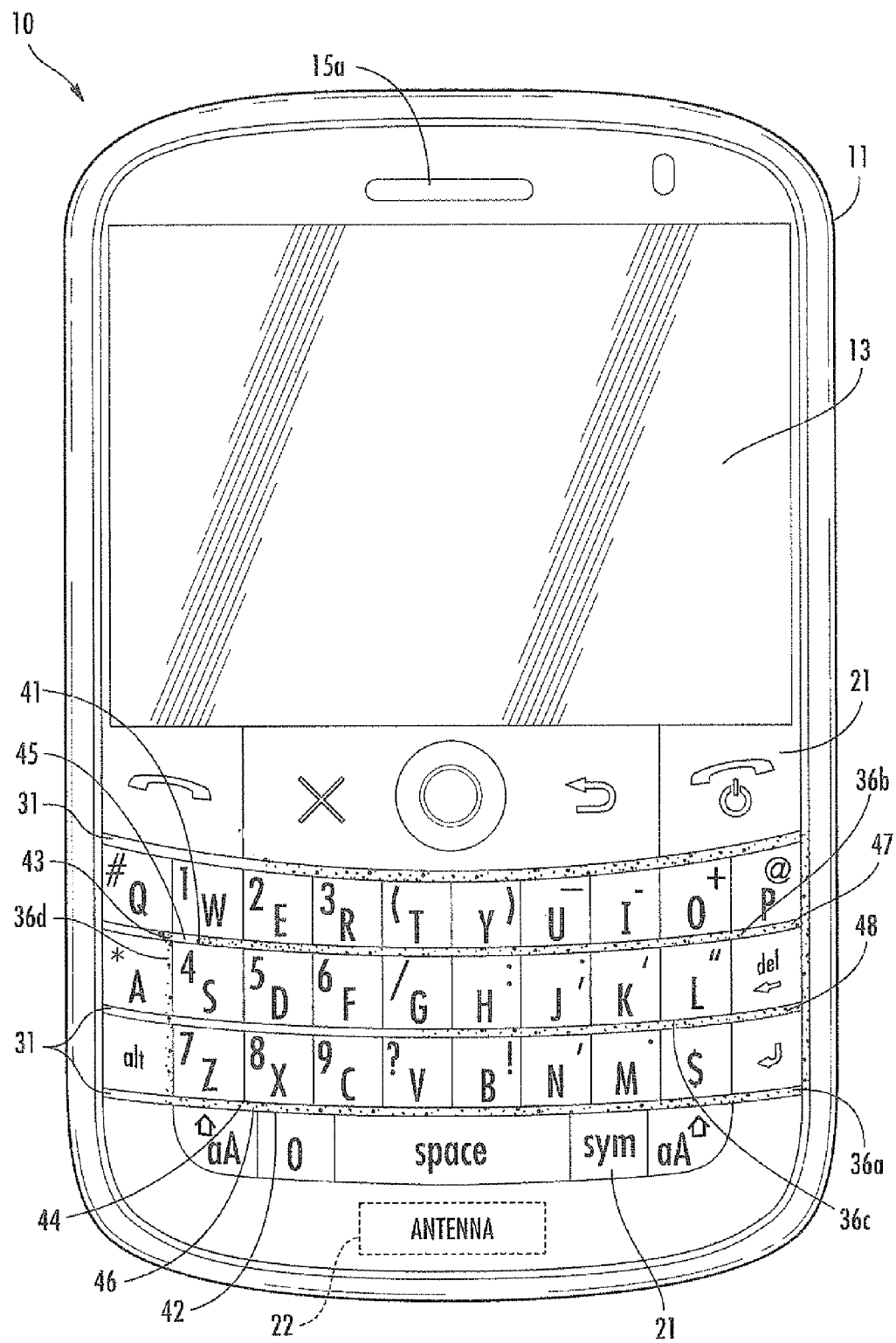
FIG. 1 is a schematic plan view of a mobile wireless communications device including a keyboard assembly in accordance with one exemplary aspect.

The present description is made with reference to the accompanying drawings, in which various example embodiments are shown. However, many different example embodiments may be used, and thus the description should not be construed as limited to the example embodiments set forth herein. Rather, these example embodiments are provided so that this disclosure will be thorough and complete. Like numbers refer to like elements throughout, and prime notation is used to indicate similar elements in alternative embodiments.

In accordance with an exemplary aspect, a mobile wireless communications device may include a portable housing and wireless transceiver circuitry carried by the portable housing. The mobile wireless communications device may also include an antenna carried by the portable housing and coupled to the wireless transceiver circuitry, and a light source carried by the portable housing, for example. The mobile wireless communications device may further include a keyboard assembly carried by the portable housing. The keyboard assembly may further include a light guide coupled to the light source and having a plurality of input key receiving openings therein, and a mask carried by the light guide and having a plurality of input key receiving openings therein aligned with the plurality of input key receiving openings of the light guide, for example. The keyboard assembly may further include a plurality of input keys within respective input key receiving openings of the light guide and the mask. The mask may include a plurality of spaced apart electrically conductive elongate members positioned relative to the antenna so as to reduce a Specific Absorption Rate (SAR) value of the mobile wireless communications device. Accordingly, the SAR value may be reduced, and, additionally, HAC compatibility may be increased.

The mask may include an opaque dielectric substrate supporting the electrically conductive layer. The opaque dielectric substrate may include at least one of paper and plastic. The plurality of spaced apart electrically conductive elongate members may include at least one of an electrically conductive ink and an electrically conductive paint, for example.

The portable housing may include an upper portion and a lower portion. The antenna and the keyboard assembly may each be carried by the lower portion of the portable housing, for example. The mobile wireless communications device may further include a display carried by the upper portion of the portable housing.

The input keys may be arranged in horizontal rows, for example, and the keyboard assembly may further include a plurality of spaced apart horizontal trim members between adjacent rows of the input keys. The wireless transceiver circuitry may include an electrical ground, for example, and the spaced apart electrically conductive elongate members may be electrically floating with respect to the electrical ground.

A method aspect is directed to a method of reducing a Specific Absorption Rate (SAR) value in a mobile wireless communications device that may include a portable housing, wireless transceiver circuitry carried by the portable housing, and an antenna carried by the portable housing and coupled to the wireless transceiver circuitry, for example. The mobile wireless communications device may also include a light source carried by the portable housing, and a keyboard assembly carried by the portable housing and including a light guide coupled to the light source and having a plurality of input key receiving openings therein. The keyboard assembly may also include a mask carried by the light guide and having a plurality of input key receiving openings therein aligned with the plurality of input key receiving openings of the light guide, and a plurality of input keys within respective input key receiving openings of the light guide and the mask. The method may include forming the mask to include a plurality of spaced apart electrically conductive elongate members relative to the antenna so as to reduce the SAR value of the mobile wireless communications device.

Figure 2:
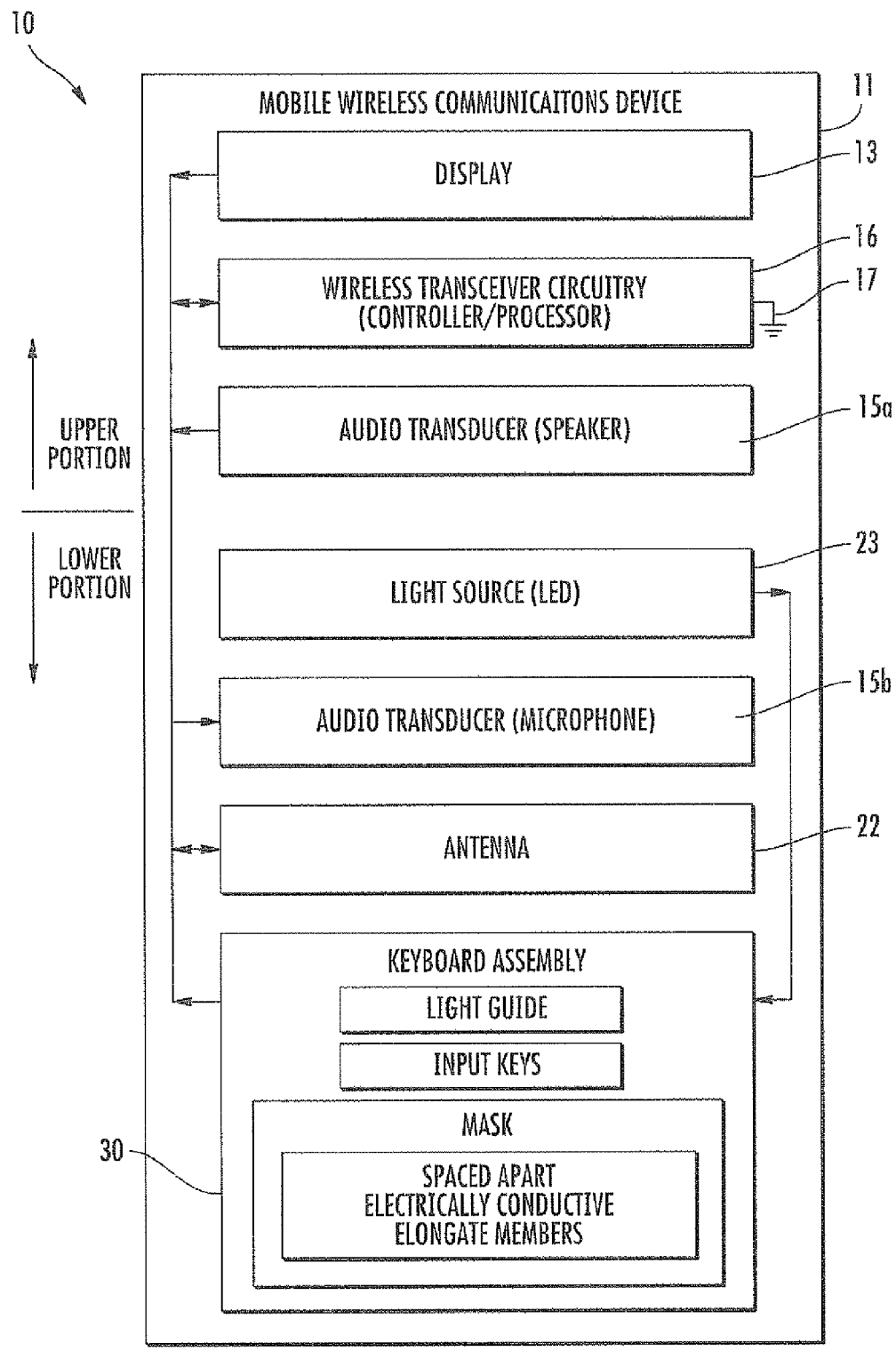
FIG. 2 is a schematic block diagram of the mobile wireless communications device of FIG. 1.
Figure 3:
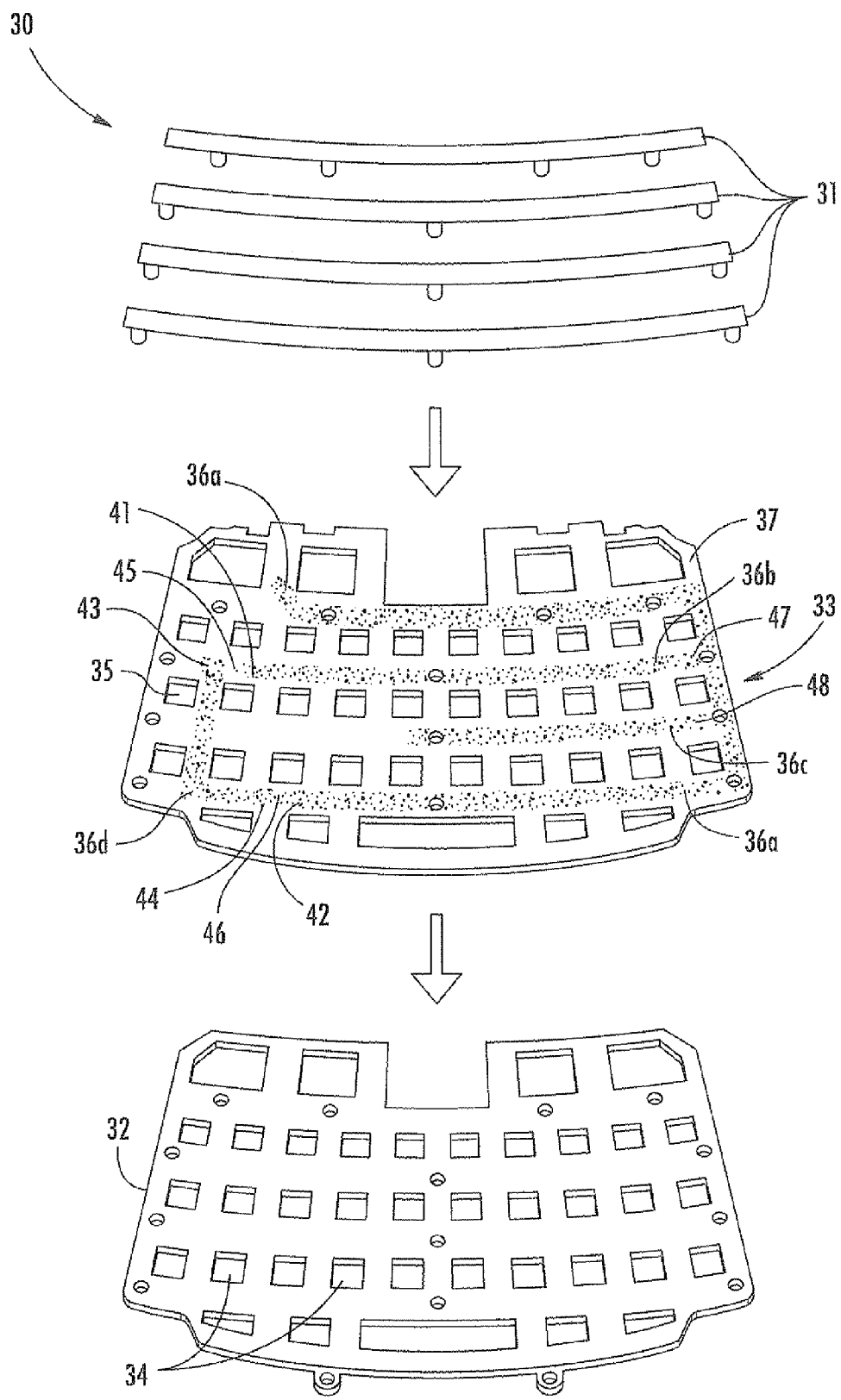
FIG. 3 is an exploded perspective view of a portion of the keyboard assembly of FIG. 1.

Referring initially to FIGS. 1-3, a mobile wireless communications device 10 illustratively includes a portable housing 11. The portable housing 11 includes an upper portion and a lower portion. In some example embodiments, the upper portion may correspond to an upward or skyward direction when being used, while the lower portion may be directed to downward direction, or toward the ground.

The mobile wireless communications device 10 also includes wireless transceiver circuitry 16. The mobile wireless communications device 10 also includes a controller 18 or processor, carried by the portable housing 11. The wireless transceiver circuitry 16 includes an electrical ground 17. For example, the wireless transceiver circuitry 16 may be coupled to a ground plane on a PCB, for example. A display 13 is also carried by the upper portion of the portable housing 11.

The mobile wireless communications device 10 also illustratively includes an audio transducer 15 carried by the portable housing 11. The audio transducer 15 may be a microphone, for example. The audio transducer 15 may also be a speaker. In some example embodiments, there may be more than one audio transducer 15, for example, a microphone 15b and speaker 15a may be used and carried by the portable housing, respectively (FIG. 2).

The mobile wireless communications device 10 includes a keyboard assembly 30 carried by the lower portion of the portable housing 11. In some embodiments (not shown), the keyboard assembly 30 may be carried by one or both of the upper and lower portion of the housing 11.

The keyboard assembly 30 includes a plurality input devices or keys 21. The input keys 21 illustratively are push buttons. The input keys 21 may be alphanumeric keys and are illustratively arranged in horizontal rows. For example, the input keys 21 may correspond to letters and numbers for typing a message, for example, an electronic mail (email) message or short messaging service (SMS) message. A thumb wheel or scroll wheel for navigation, for example, or other type of input device, may also be included, as will be appreciated by those skilled in the art.

As will be appreciated by those skilled in the art, the input keys 21 may be for cooperating with the wireless transceiver circuitry 16 and may also correspond to wireless communication functions, for example, for placing or ending a telephone call. Additional input devices may be included outside of the keyboard assembly 30, and may be carried by another portion of the portable housing 11.

The mobile wireless communications device 10 also includes an antenna 22 carried by the lower portion of the portable housing 11. The antenna 22 is also coupled to the wireless transceiver circuitry 16. The antenna 22 may be a cellular antenna, for example, and cooperate with the wireless transceiver circuitry 16, to provide cellular communications. The antenna 22 may be another type of antenna, for example, a wireless local area network (WLAN) antenna, and may be carried by the upper portion of the portable housing 11. The antenna 22 may also be carried by both the upper and lower portions of the portable housing 11 in other embodiments. The mobile wireless communications device 10 may include more than one antenna, which may be positioned in one or both of the upper and lower portions of the portable housing 11.

A light source 23 is also carried by the portable housing 11. The light source 23 may be one or more light emitting diodes (LEDs), for example. The light source 23 may be another type of source, as will be appreciated by those skilled in the art.

The keyboard assembly 30 illustratively includes a light guide 32 coupled to the light source 23. The light guide 32 may be a molded, translucent plastic light guide, for example. Of course, the light guide 32 may be transparent, and may be another material. The light guide 32 also includes input key receiving openings 34 therein.

A mask 33 is carried by the light guide 32 and also has input key receiving openings 35 therein aligned with the plurality of input key receiving openings 34 of the light guide 32. The input keys 21 are positioned within respective input key receiving openings 35, 34 of the light guide 32 and the mask 33, respectively.

Figure 4:
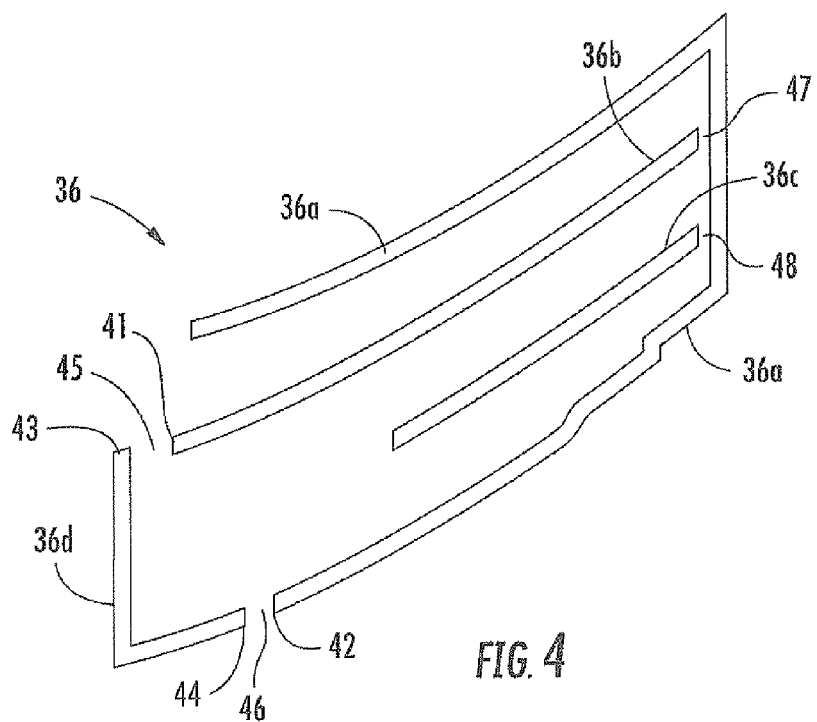
FIG. 4 is an enlarged perspective view of the spaced apart electrically conductive elongate members of FIG. 3.

Referring additionally to FIGS. 4 and 5, the mask 33 includes spaced apart electrically conductive elongate members 36. The spaced apart electrically conductive elongate members 36 may be provided by an electrically conductive ink, for example a silver ink.

The spaced apart electrically conductive elongate members 36 may also be provided by an electrically conductive paint. The spaced apart electrically conductive elongate members 36 may be another type of conductive material, for example, a conductive metal, such as copper, as will be appreciated by those skilled in the art. In some example embodiments (not shown), a non-conductive layer of non-conductive ink, paint, or other material may cover the spaced apart electrically conductive elongate members 36.

Figure 5A:
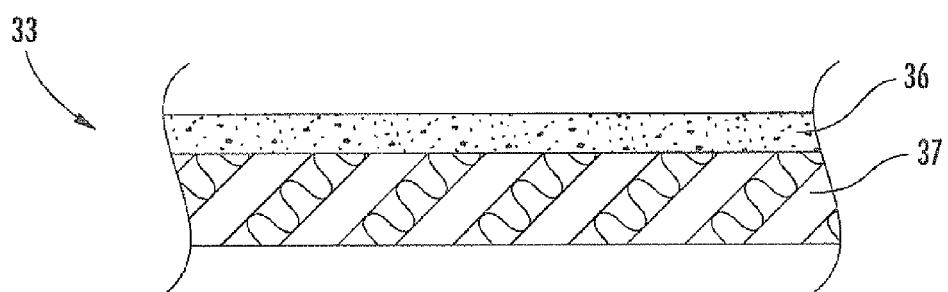
FIGS. 5*a*-5*b* are greatly enlarged cross-sectional views of a portion of the mask layer of the keyboard assembly of FIG. 1 including a spaced apart electrically conductive elongate member.
Figure 5B:
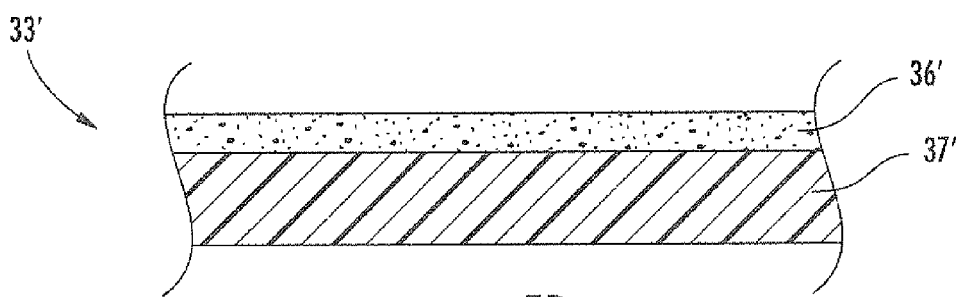

The mask 33 includes an opaque dielectric substrate 37 supporting the spaced apart electrically conductive elongate members 36. The opaque dielectric substrate 37 may be paper, for example, and may be in a sheet form (FIG. 5a). In another embodiment, the opaque dielectric substrate 37' may be plastic (FIG. 5b), for example, Mylar™. The opaque dielectric substrate 37 may include other types of materials, as will be appreciated by those skilled in the art, and, in some embodiments, may not be opaque.

Two spaced apart electrically conductive elongate members 36b, 36c are illustratively positioned between adjacent rows of the input keys 21, or more particularly, between adjacent rows of the input key receiving openings 34, 35. One spaced apart electrically conductive elongate member 36a is illustratively U-shaped and extends along a portion of the perimeter of the substrate 37. An L-shaped electrically conductive elongate member 36d is positioned adjacent an end 41 of the electrically conducive elongate member 36b and an end 42 of the U-shaped electrically conductive elongate member 36a. Opposing ends 43, 44 of the L-shaped electrically conductive elongate member 36d are spaced from the end 41 of the electrically conducive elongate member 36b and the end 42 of the U-shaped electrically conductive elongate member 36a by gaps 45, 46, of 4 millimeters (mm) and 2 mm, respectively. The electrically conductive elongate members 36b and 36c are also illustratively spaced apart from the U-shaped electrically conductive elongate member by respective gaps 47, 48 of 0.5 mm. As will be appreciated by those skilled in the art, the spaced apart electrically conductive elongate members 36 may be configured in another arrangement with different spacing distances therebetween and having different shaped electrically conductive elongate members. Any number of spaced apart electrically conductive elongate members 36 may also be used. By adjusting the shape and spacing of the electrically conductive elongate members 36, the SAR value may be reduced in an area of increased exposure, while reducing the effects on antenna operation.

Additionally, the spaced apart electrically conductive elongate members 36 are electrically floating with respect to the electrical ground 17. The spaced apart electrically conductive elongate members 36 being electrically floating reduces the electromagnetic interference (EMI) shielding from the antenna 22 as will be appreciated by those skilled in the art.

The spaced apart electrically conductive elongate members 36 are positioned relative to the antenna 22 to advantageously reduce a SAR value of the mobile wireless communications device 10. For example, the relative positioning of the spaced apart electrically conductive elongate members 36 to the antenna 22 may reduce radiation power exposure to a given user by about 10%-20% and, thus, reduce SAR for antenna operation. The spaced apart electrically conductive elongate members 36 may have a relatively small effect on the total radiated power of the antenna 22, and thus, overall antenna performance.

As will be appreciated by those skilled in the art, SAR values are increasingly an issue for mobile wireless communications devices. For example, regulatory authorities may set maximum SAR values for a mobile wireless communications device. Accordingly, it may be desirable to reduce a SAR value for a mobile wireless communications device.

Existing approaches for reducing a SAR value may include adjusting the antenna, both electrically and physically, and changing geometry of the mobile wireless communications device, for example changing the size and shape of the housing. Both antenna adjustment and form factor changing may result in costly design changes that may increase the size of a portable housing, for example. Indeed, the relative positioning of the electrically conductive layer to the antenna 22 advantageously reduces a SAR value of the mobile wireless communications device 10 without changing the geometry of the portable housing, or making adjustments to the antenna, for example. Thus, the SAR value is reduced at a relatively low cost.

The keyboard assembly 30 also includes spaced apart horizontal trim members 31. The spaced apart horizontal trim members 31 are positioned between adjacent rows of the input keys 21. As will be appreciated by those skilled in the art, the spaced apart horizontal trim members 31 may provide increased rigidity to the keyboard assembly 30. Additionally, the horizontal trim members 31 may couple the mask 33 to the light guide 32. In some embodiments, the horizontal trim members 31 may not be included, or other types of structural support members or trim members may be used.

A method aspect is directed to a method of reducing a Specific Absorption Rate (SAR) value in a mobile wireless communications device 10 that includes a portable housing 11, wireless transceiver circuitry 16 carried by the portable housing, and an antenna 22 carried by the portable housing and coupled to the wireless transceiver circuitry, for example. The mobile wireless communications device 10 includes a light source 23 carried by the portable housing 11, and a keyboard assembly 30 carried by the portable housing and including a light guide 32 coupled to the light source and having input key receiving openings 34 therein. The keyboard assembly 30 also includes a mask 33 carried by the light guide 32 and having a input key receiving openings 35 therein aligned with the input key receiving openings 34 of the light guide, and a input keys 21 within respective input key receiving openings 34, 35 of the light guide 32 and the mask 33. The method may include forming the mask 33 to include spaced apart electrically conductive elongate members 36 relative to the antenna 22 so as to reduce the SAR value of the mobile wireless communications device 10.

Exemplary components that may be used in various embodiments of the above-described mobile wireless communications device are now described with reference to an exemplary mobile wireless communications device 1000 shown in FIG. 6. The device 1000 illustratively includes a housing 1200, a keypad 1400 and an output device 1600. The output device shown is a display 1600, which may comprise a full graphic LCD. In some embodiments, display 1600 may comprise a touch-sensitive input and output device. Other types of output devices may alternatively be utilized. A processing device 1800 is contained within the housing 1200 and is coupled between the keypad 1400 and the display 1600. The processing device 1800 controls the operation of the display 1600, as well as the overall operation of the mobile device 1000, in response to actuation of keys on the keypad 1400 by the user. In some embodiments, keypad 1400 may comprise a physical keypad or a virtual keypad (e.g., using a touch-sensitive interface) or both.

The housing 1200 may be elongated vertically, or may take on other sizes and shapes (including clamshell housing structures, for example). The keypad 1400 may include a mode selection key, or other hardware or software for switching between text entry and telephony entry.

Figure 6:
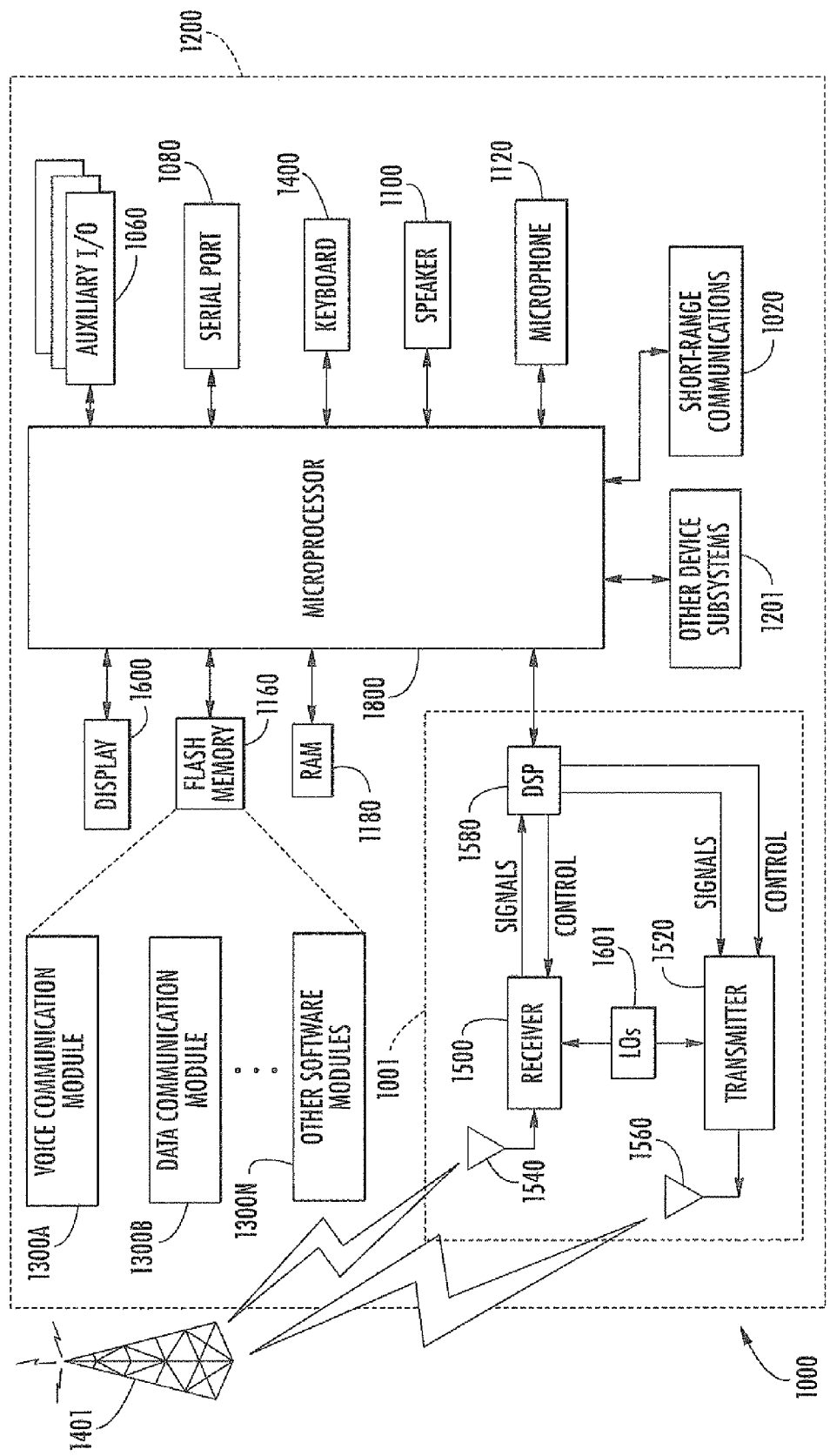
FIG. 6 is a schematic block diagram illustrating additional components that may be included in the mobile wireless communications device of FIG. 1.

In addition to the processing device 1800, other parts of the mobile device 1000 are shown schematically in FIG. 6. These include a communications subsystem 1001; a short-range communications subsystem 1020; the keypad 1400 and the display 1600, along with other input/output devices 1060, 1080, 1100 and 1120; as well as memory devices 1160, 1180 and various other device subsystems 1201. The mobile device 1000 may comprise a two-way RF communications device having voice and data communications capabilities. In addition, the mobile device 1000 may have the capability to communicate with other computer systems via the Internet.

Operating system software executed by the processing device 1800 may be stored in a persistent store, such as the flash memory 1160, but may be stored in other types of memory devices, such as a read only memory (ROM) or similar storage element. In addition, system software, specific device applications, or parts thereof, may be temporarily loaded into a volatile store, such as the random access memory (RAM) 1180. Communications signals received by the mobile device may also be stored in the RAM 1180.

The processing device 1800, in addition to its operating system functions, enables execution of software applications or modules 1300A-1300N on the device 1000, such as software modules for performing various steps or operations. A predetermined set of applications that control basic device operations, such as data and voice communications 1300A and 1300B, may be installed on the device 1000 during manufacture. In addition, a personal information manager (PIM) application may be installed during manufacture. The PIM may be capable of organizing and managing data items, such as e-mail, calendar events, voice mails, appointments, and task items. The PIM application may also be capable of sending and receiving data items via a wireless network 1401. The PIM data items may be seamlessly integrated, synchronized and updated via the wireless network 1401 with the device user's corresponding data items stored or associated with a host computer system.

Communication functions, including data and voice communications, are performed through the communications subsystem 1001, and possibly through the short-range communications subsystem. The communications subsystem 1001 includes a receiver 1500, a transmitter 1520, and one or more antennas 1540 and 1560. In addition, the communications subsystem 1001 also includes a processing module, such as a digital signal processor (DSP) 1580, and local oscillators (LOs) 1601. The specific design and implementation of the communications subsystem 1001 is dependent upon the communications network in which the mobile device 1000 is intended to operate. For example, a mobile device 1000 may include a communications subsystem 1001 designed to operate with the Mobitex™, Data TAC™ or General Packet Radio Service (GPRS) mobile data communications networks, and also designed to operate with any of a variety of voice communications networks, such as AMPS, TDMA, CDMA, WCDMA, PCS, GSM, EDGE, etc. Other types of data and voice networks, both separate and integrated, may also be utilized with the mobile device 1000. The mobile device 1000 may also be compliant with other communications standards such as GSM, 3G, UMTS, 4G, etc.

Network access requirements vary depending upon the type of communication system. For example, in the Mobitex and DataTAC networks, mobile devices are registered on the network using a unique personal identification number or PIN associated with each device. In GPRS networks, however, network access is associated with a subscriber or user of a device. A GPRS device therefore utilizes a subscriber identity module, commonly referred to as a SIM card, in order to operate on a GPRS network.

When required network registration or activation procedures have been completed, the mobile device 1000 may send and receive communications signals over the communication network 1401. Signals received from the communications network 1401 by the antenna 1540 are routed to the receiver 1500, which provides for signal amplification, frequency down conversion, filtering, channel selection, etc., and may also provide analog to digital conversion. Analog-to-digital conversion of the received signal allows the DSP 1580 to perform more complex communications functions, such as demodulation and decoding. In a similar manner, signals to be transmitted to the network 1401 are processed (e.g. modulated and encoded) by the DSP 1580 and are then provided to the transmitter 1520 for digital to analog conversion, frequency up conversion, filtering, amplification and transmission to the communication network 1401 (or networks) via the antenna 1560.

In addition to processing communications signals, the DSP 1580 provides for control of the receiver 1500 and the transmitter 1520. For example, gains applied to communications signals in the receiver 1500 and transmitter 1520 may be adaptively controlled through automatic gain control algorithms implemented in the DSP 1580.

In a data communications mode, a received signal, such as a text message or web page download, is processed by the communications subsystem 1001 and is input to the processing device 1800. The received signal is then further processed by the processing device 1800 for an output to the display 1600, or alternatively to some other auxiliary I/O device 1060. A device user may also compose data items, such as e-mail messages, using the keypad 1400 and/or some other auxiliary I/O device 1060, such as a touchpad, a rocker switch, a thumb-wheel, or some other type of input device. The composed data items may then be transmitted over the communications network 1401 via the communications subsystem 1001.

In a voice communications mode, overall operation of the device is substantially similar to the data communications mode, except that received signals are output to a speaker 1100, and signals for transmission are generated by a microphone 1120. Alternative voice or audio I/O subsystems, such as a voice message recording subsystem, may also be implemented on the device 1000. In addition, the display 1600 may also be utilized in voice communications mode, for example to display the identity of a calling party, the duration of a voice call, or other voice call related information.

The short-range communications subsystem enables communication between the mobile device 1000 and other proximate systems or devices, which need not necessarily be similar devices. For example, the short-range communications subsystem 1020 may include an infrared device and associated circuits and components, near-field communication (NFC), or a Bluetooth™ communications module to provide for communication with similarly-enabled systems and devices.

Many modifications and other embodiments will come to the mind of one skilled in the art having the benefit of the teachings presented in the foregoing descriptions and the associated drawings. Therefore, it is understood that the disclosure is not to be limited to the specific embodiments disclosed, and that modifications and embodiments are intended to be included.

That which is claimed is:

1. A mobile wireless communications device comprising:
   a portable housing;
   wireless transceiver circuitry carried by said portable housing;
   an antenna carried by said portable housing and coupled to said wireless transceiver circuitry;
   a light source carried by said portable housing; and
   a keyboard assembly carried by said portable housing and comprising
      a light guide coupled to said light source and having a plurality of input key receiving openings therein,
      a mask carried by said light guide and having a plurality of input key receiving openings therein aligned with the plurality of input key receiving openings of said light guide, and
      a plurality of input keys within respective input key receiving openings of said light guide and said mask,
      said mask comprising a plurality of spaced apart electrically conductive elongate members positioned relative to said antenna so as to reduce a Specific Absorption Rate value of the mobile wireless communications device.

2. The mobile wireless communications device of claim 1, wherein said mask comprises an opaque dielectric substrate supporting said plurality of spaced apart electrically conductive elongate members.

3. The mobile wireless communications device of claim 1, wherein said plurality of spaced apart electrically conductive elongate members is positioned between selected ones of said plurality of input key receiving openings.

4. The mobile wireless communications device of claim 2, wherein said opaque dielectric substrate comprises at least one of paper and plastic.

5. The mobile wireless communications device of claim 1, wherein said plurality of spaced apart electrically conductive elongate members comprises at least one of an electrically conductive ink and an electrically conductive paint.

6. The mobile wireless communications device of claim 1, wherein said plurality of spaced apart electrically conductive elongate members comprises copper.

7. The mobile wireless communications device of claim 1, wherein said portable housing comprises an upper portion and a lower portion; and wherein said antenna and said keyboard assembly are each carried by the lower portion of said portable housing.

8. The mobile wireless communications device of claim 7, further comprising a display carried by the upper portion of said portable housing.

9. The mobile wireless communications device of claim 1, wherein said input keys are arranged in horizontal rows; and wherein each of said plurality of spaced apart electrically conductive elongate members is positioned between adjacent rows of said input keys.

10. The mobile wireless communications device of claim 1, wherein said wireless transceiver circuitry comprises an electrical ground; and wherein said plurality of spaced apart electrically conductive elongate members is electrically floating with respect to said electrical ground.

11. A mobile wireless communications device comprising:
a portable housing;
wireless transceiver circuitry carried by said portable housing and comprising an electrical ground;
an antenna carried by said portable housing and coupled to said wireless transceiver circuitry;
a light source carried by said portable housing; and
a keyboard assembly carried by said portable housing and comprising
a light guide coupled to said light source and having a plurality of input key receiving openings therein,
a mask carried by said light guide and having a plurality of input key receiving openings therein aligned with the plurality of input key receiving openings of said light guide, and
a plurality of input keys within respective input key receiving openings of said light guide and said mask,
said mask comprising a plurality of spaced apart electrically conductive elongate members and an opaque dielectric substrate supporting said plurality of spaced apart electrically conductive elongate members positioned relative to said antenna so as to reduce a Specific Absorption Rate value of the mobile wireless communications device,
said plurality of spaced apart electrically conductive elongate members being electrically floating with respect to said electrical ground.

12. The mobile wireless communications device of claim 11, wherein said opaque dielectric substrate comprises at least one of paper and plastic.

13. The mobile wireless communications device of claim 11, wherein said plurality of spaced apart electrically conductive elongate members comprises at least one of an electrically conductive ink and an electrically conductive paint.

14. The mobile wireless communications device of claim 11, wherein said portable housing comprises an upper portion and a lower portion; and wherein said antenna and said keyboard assembly are each carried by the lower portion of said portable housing.

15. The mobile wireless communications device of claim 11, wherein said input keys are arranged in horizontal rows; and wherein each of said plurality of spaced apart electrically conductive elongate members is positioned between adjacent rows of said input keys.

16. The mobile wireless communications device of claim 11, wherein said wireless transceiver circuitry comprises an electrical ground; and wherein said plurality of spaced apart electrically conductive elongate members is electrically floating with respect to said electrical ground.

17. A method of reducing a Specific Absorption Rate (SAR) value in a mobile wireless communications device comprising a portable housing, wireless transceiver circuitry carried by the portable housing, an antenna carried by the portable housing and coupled to the wireless transceiver circuitry, a light source carried by the portable housing, and a keyboard assembly carried by the portable housing and comprising a light guide coupled to the light source and having a plurality of input key receiving openings therein, a mask carried by the light guide and having a plurality of input key receiving openings therein aligned with the plurality of input key receiving openings of the light guide, and a plurality of input keys within respective input key receiving openings of the light guide and the mask, the method comprising:
forming the mask to include a plurality of spaced apart electrically conductive elongate members positioned relative to the antenna so as to reduce the SAR value of the mobile wireless communications device.

18. The method of claim 17, wherein forming the mask further comprises forming the mask to include an opaque dielectric substrate supporting the plurality of spaced apart electrically conductive elongate members.

19. The method of claim 18, wherein the opaque dielectric substrate comprises at least one of paper and plastic.

20. The method of claim 17, wherein the plurality of spaced apart electrically conductive elongate members comprises at least one of an electrically conductive ink and an electrically conductive paint.

21. The method of claim 17, wherein forming the mask to include the plurality of spaced apart electrically conductive elongate members comprises forming the mask to include the plurality of spaced apart electrically conductive elongate members so that it is floating with respect to an electrical ground.

* * * * *